United States Patent [19]

Reid

[11] Patent Number: 5,652,468
[45] Date of Patent: Jul. 29, 1997

[54] CROSS-OVER COMPENSATION CIRCUIT

[76] Inventor: Dennis Reid, 107 Rodeo Ct., Lafayette, Calif. 94523

[21] Appl. No.: 526,028

[22] Filed: Sep. 8, 1995

[51] Int. Cl.[6] .................................................. H01H 43/04
[52] U.S. Cl. .......................................... 307/10.1; 307/141.4
[58] Field of Search ................................ 307/9.1, 10.1, 307/10.6, 141, 141.4, 141.8, 142; 180/287, 370; 361/194–198; 123/179.3, 335, 333

[56] References Cited

U.S. PATENT DOCUMENTS

| Re. 32,474 | 8/1987 | Reid | 307/9.1 |
|---|---|---|---|
| 4,467,219 | 8/1984 | Reid | 361/196 |
| 4,596,215 | 6/1986 | Palesotti | 123/335 |
| 4,812,671 | 3/1989 | Furrow | 307/10.1 |

*Primary Examiner*—Richard T. Elms
*Attorney, Agent, or Firm*—Ronald L. Yin; Limbach & Limbach LLP

[57] ABSTRACT

A cross-over compensation circuit for use in controlling the start of a vehicle has a delay apparatus which can be programmed to set the handicap period and the delay period. In addition, the delay apparatus has user selectable means for setting a compensation period. A counter circuit stores the time period representative of the compensation period as a number of pulses. A faster clock signal is generated which is supplied to the counter and to the delay apparatus to subtract the compensation period from the handicap period to generate an adjusted handicap period. Upon expiration of the adjusted handicap period and the delay period, the delay apparatus disengages the brake means for the vehicle and starts the vehicle. The circuit can also be implemented by a microprocessor. A delay on circuit wherein the delay box is activated only after the switch is held for a pre-determined period of time is also disclosed.

32 Claims, 5 Drawing Sheets

5,652,468

CROSS-OVER COMPENSATION CIRCUIT

TECHNICAL FIELD

The present invention relates to a circuit for controlling the start of a vehicle in a competitive race where the vehicle is subject to a handicap period and a delay period and the vehicle is started by engaging the engine of the vehicle and having a brake means to hold the vehicle with a delay means disengaging the brake means after the period of delay and the handicap period. The period of delay and the handicap period set in the delay means is further adjusted by a time period caused by the user activating the delay means upon a visual indicator from a competitor's start command.

BACKGROUND OF THE INVENTION

Variable time delay apparatuses for controlling the start of a vehicle are well known in the art. See, for example, U.S. Pat. Re. No. 32,474, reissued Aug. 11, 1987. As stated in that patent, in the sport of automotive racing, the race is begun by a starting system consisting of a series of lights of various numbers, commonly called "Christmas tree" lights. Typically, there are one to five warning lights of amber color, one green colored light to indicate the start of the race, and one red light to indicate a foul start. Vehicles are lined in a row, and when the green light appears, the vehicles start the race. To attempt to obtain the best start, vehicles are placed in low gear with the reverse gear, simultaneously applied thereto, thereby "jamming" the transmission. The engine is run at high speed and when the reverse gear is removed by, for example, the release of a solenoid, the engine power is then instantly transmitted to the wheels through the low gear. This results in extreme quick acceleration of the race vehicle.

In automotive racing, the vehicle should ideally leave the starting line at exactly the time when the green light turns on. To accomplish this, however, the driver must anticipate the green light and release the solenoid before the green light comes on. This is because the driver has a reaction time and the car also has its reaction time. By the use of a delay device, the driver can preset a delay period, timed to commence with the start of any of the lights on the "Christmas tree". The driver would start the delay device, and then after the period of preset delay the delay device would release the solenoid which starts the vehicle. This would overcome the problem of the driver hesitating or anticipating the turning on of the green light.

It is also known in the prior art to use a cross-over delay device in handicap racing. In handicap racing, due to the difference in performance of the vehicles, one vehicle, the faster vehicle, is started after a handicap period, after the start of the slower vehicle. Thus, in handicap racing, the slower vehicle starts, followed by a handicap time period, which then starts the Christmas tree lights of the faster car. A cross-over delay box is simply two delay boxes attached in series. The faster vehicle has a first component which is simply the delay component described heretofore. A second component is the ability for the driver to set the handicap time period. This is the amount of time that the faster car is "penalized". The driver of the faster car would start the cross-over delay box upon the start of the Christmas tree light associated with the "slower" vehicle. That way, once the handicap period times out, it would activate the delay period. Thereafter, when both the handicap period and the delay period have timed out, the faster vehicle would then start. In this way, the driver would activate the cross-over delay box at the same time as the beginning of the Christmas tree lights of the opponent's lane thereby avoiding the distraction when the opponent's car has left the lane.

However, notwithstanding the use of a cross-over delay box, the driver of the faster vehicle that activates the cross-over delay box activates it based upon a glancing view of the Christmas tree lights of the opponent's lane. This has the potential for error which must be accounted for.

Finally, it is well know in the prior art that drivers of racing vehicles can accidentally activate the switch that controls a delay box. When the switch is accidentally activated, the transbrake is turned on and stays on until the delay box times out. If a vehicle is under power and is rolling down the track, and if the driver accidentally activates the delay box, the transbrake is activated, which can cause the transmission to explode or to lock up the rear wheels.

To overcome this condition, manufacturers of electronic racing aid devices, provide either a separate switch to disable the delay box, or a lock-out timing device, under which the delay box cannot be activated until the time period on the lock-out timing device has timed out. In either case, however, the driver must activate a switch to either disable the delay box or to de-activate the lock-out period.

SUMMARY OF THE INVENTION

A cross-over compensation circuit controls the start of a vehicle in a competitive race. The vehicle is started by engaging the engine of the vehicle and a braking means to hold the vehicle. The cross-over compensation circuit comprises an adjustable time delay means for setting the period of delay and the handicap period. The cross-over compensation circuit also comprises a user selectable means for setting a compensation period. Finally, the circuit comprises means which is responsive to the user selectable means for adjusting the adjustable time delay means by the compensation period. Upon expiration of the time period set in the delay means, as adjusted, the braking means is then disengaged.

The present invention also relates to a delay-on circuit which is for use with an electronic device to control the start of a vehicle such as a conventional delay box. The vehicle is started by engaging the engine of the vehicle and a brake means to hold the vehicle, then disengaging the brake after a period of delay. The delay on circuit comprises means for activating the brake after a period of user selectable delay. The brake is activated upon the expiration of the period of user selectable delay, if the activating means is engaged continuously during that period of user selectable delay.

DETAILED DESCRIPTION OF THE DRAWINGS

Figure 1:
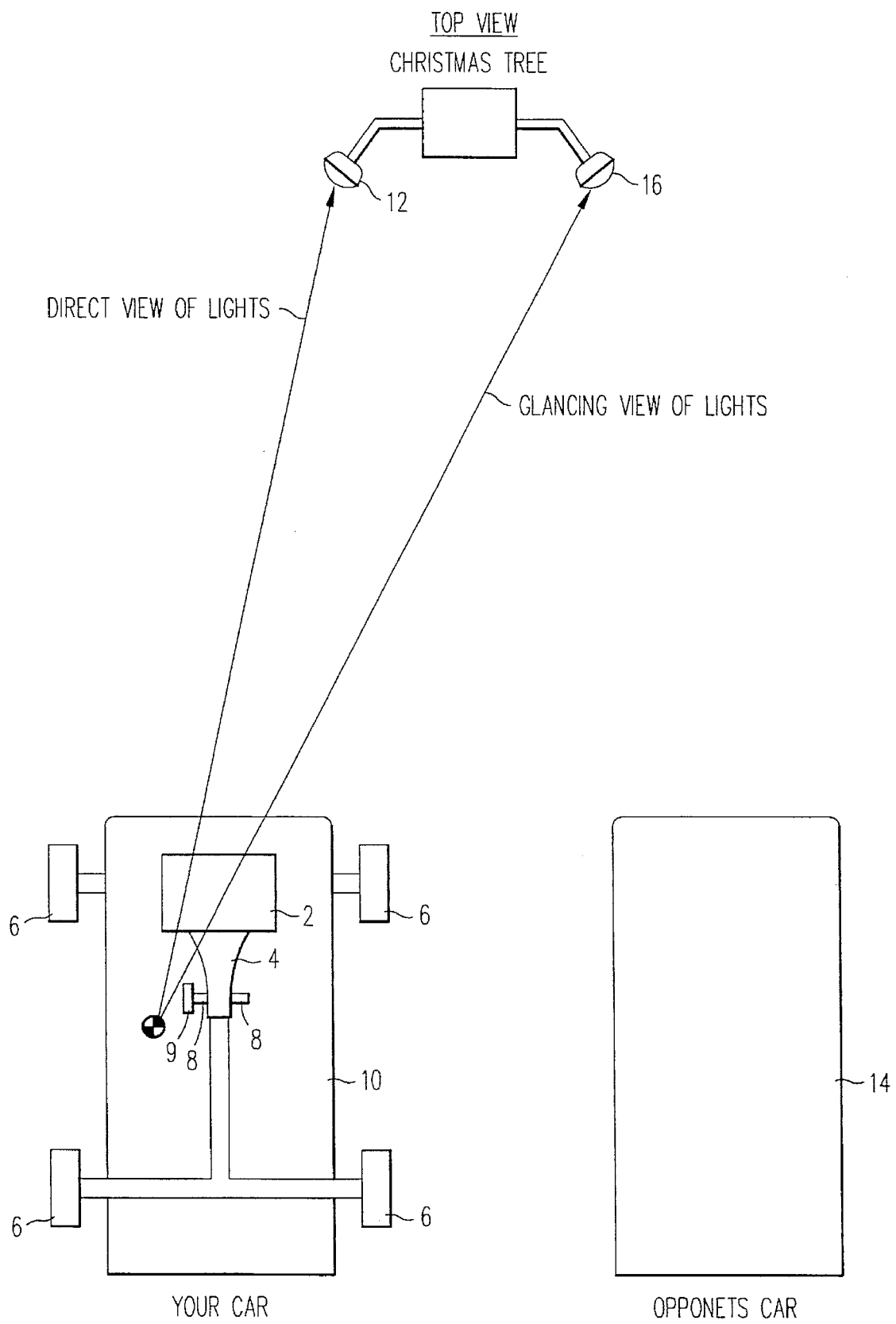
FIG. 1 is a top overview of the environment in which the cross-over compensation circuit of the present invention is intended to operate showing a competitive race with the faster vehicle subject to a handicap period and a delay period and its driver's field of view of the Christmas tree lights that start the race.

Referring to FIG. 1 there is shown a top view of two racing vehicles 10 and 14. The first racing vehicle 10 is deemed the "faster" vehicle and thus has a handicap period associated therewith. The second vehicle 14 is deemed the "slower" vehicle and therefore would start first followed by the first vehicle 10 after the handicap period. Each vehicle 12 and 14 is characterized by an engine 2 coupled to a transmission 3 connected to wheels 6. Prior to the start of the race, the engine 2 of each vehicle 12 and 14 is turned on to maximum power. However, the vehicle is not moved because a solenoid 9 activated transbrake 8 prevents the power from the transmission 4 from being applied to the wheels 6. The vehicles 10 and 14 are started by a start command, typically a set of Christmas tree lights. A first set of Christmas tree lights 12 is the visual indicators for the start command for the first vehicle 10. A second set of Christmas tree lights 16 forms the visual start command for the second vehicle 14. Typically, the second set of Christmas tree lights 16 are first activated, and the handicap period started. Upon the expiration of the handicap period, the first Christmas tree lights 12 are activated. When the green light for the second Christmas tree lights for each lane is lit, the vehicle 10 or 14 in that lane can start by releasing the transbrake 8.

Figure 2:
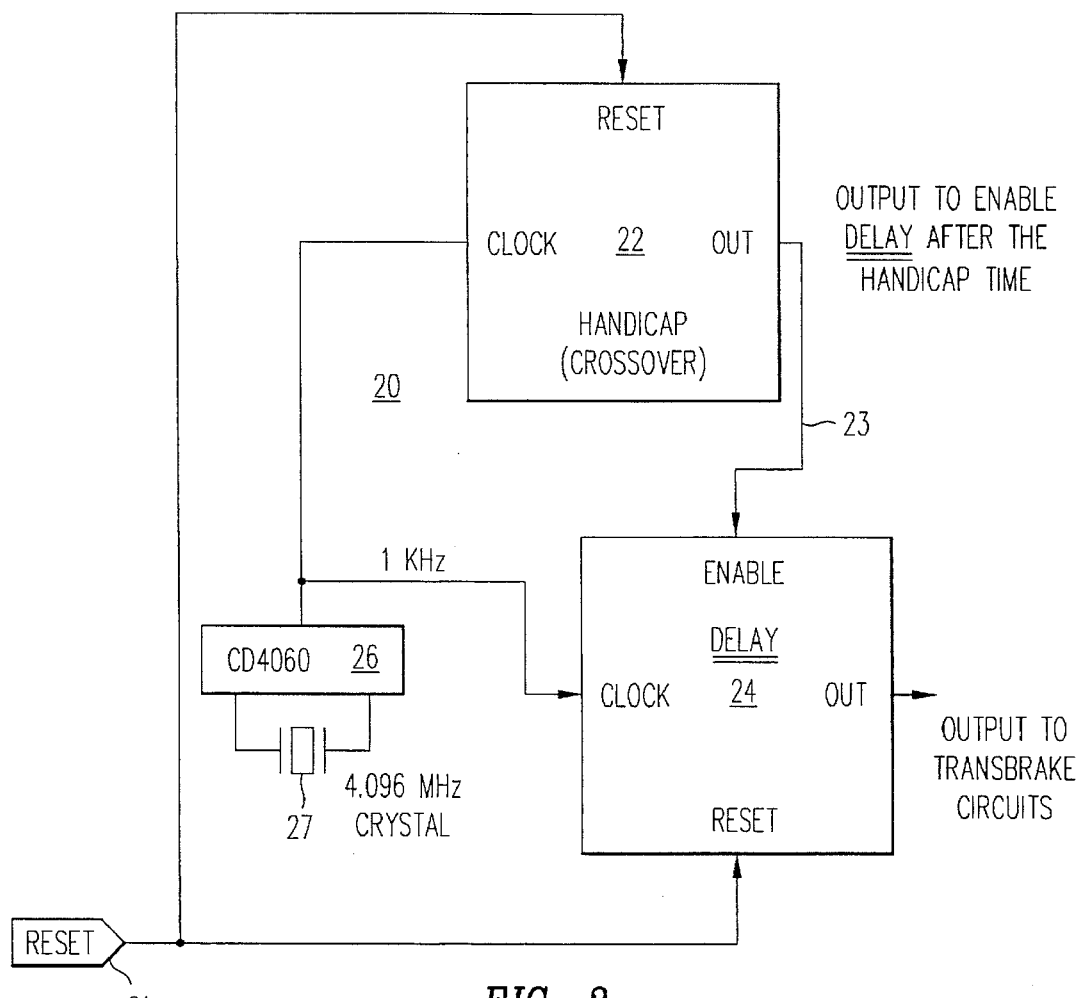
FIG. 2 is a block level circuit diagram of a cross-over circuit of the prior art.

As previously discussed, cross-over delay apparatuses are well known in the art. Referring to FIG. 2, there is shown a schematic block diagram of a cross-over delay apparatus 20 of the prior art. The cross-over delay apparatus 20 is used by the driver of the first vehicle 10. The cross-over delay apparatus 20 comprises a handicap circuit section 22 and a delay circuit section 24. Further, the cross-over delay apparatus 20 comprises a frequency divider circuit 26, which in the preferred embodiment is a CD4060 being supplied with oscillation signals from a 4.096 MHz crystal 27. The output of the frequency divider circuit 26 is a clock signal having a frequency pulse rate of 1 KHz. The clock signal is supplied to the clock input of the handicap circuit section 22 and the clock input of the delay circuit section 24. The output 23 of the handicap circuit section 22 is supplied to the enable of the delay circuit section 24. The output of the delay circuit section 24 is supplied to the transbrake circuit 8 to activate the solenoid 9 to disengage the brakes 8.

In operation, the driver of the faster vehicle 10 sets the amount of handicap delay in the handicap circuit section 22 using, for example, thumbwheel switches (not shown). Typically, the predicted elapsed times of each vehicle is dialed into the two sets of thumbwheels and the electronics uses these times to calculate and/or delay the amount of handicap period desired. Other inputs, well known in the art, suitable for inputting the amount of handicap period can also be used. The driver of the faster vehicle 10 also inputs into the delay circuit section 24 an amount of delay that is needed by the driver seeing a particular light on the Christmas tree 12 being lit and the vehicle leaving the starting line to prevent a "foul" start (leaving before the Christmas tree signals a green light).

With the handicap period and the delay period set, the driver of the faster vehicle 10 then focuses on the second Christmas tree lights 16 which signifies the start for the second vehicle 14. The driver then holds down the reset switch. Thus, for example, when the driver of the faster vehicle 10 sees the illumination of the first light in the series of the second Christmas tree lights 16, the driver activates the delay apparatus 20 by releasing the reset switch 21.

Once the reset switch 21 is released, clock signals at 1 KHz rate are counted by the handicap circuit section 22. The handicap circuit section 22 counts the number of 1 KHz pulses from the clock 26. Upon receiving a certain number of pulses, which equals the handicap period, the handicap circuit section 22 generates an output signal 23 which is supplied to the delay circuit section 24. The number of 1 KHz pulses that the handicap circuit section 22 counts is equal to the handicap period divided by 1 KHz. The output signal 23 enables the delay circuit section 24. The delay circuit section 24 can then count the same 1 KHz pulses from the clock 26. Again, upon receiving the requisite number of pulses from the clock 26 (equaling the delay period divided by 1 KHz), the delay circuit section 24 would then generate an output signal to the transbrake circuit to disengage the braking means.

As previously discussed, the problem with the foregoing described delay apparatus 20 is that the driver of the faster vehicle 10 has only a glancing view of the lights on the second Christmas tree 16. The driver does not have a "direct" view of the second Christmas tree lights 16 as the driver would in the case of viewing the first Christmas tree lights 12. Due to this glancing view of the second Christmas tree lights 16, a driver's reaction time is not as fast as if the driver were looking directly at the corresponding starting lights, such as the first Christmas tree lights 12. Thus, there is a "compensation error" when the driver in a handicap race uses a delay apparatus 20 that is triggered from the start of a competitor's Christmas lights.

Figure 3:
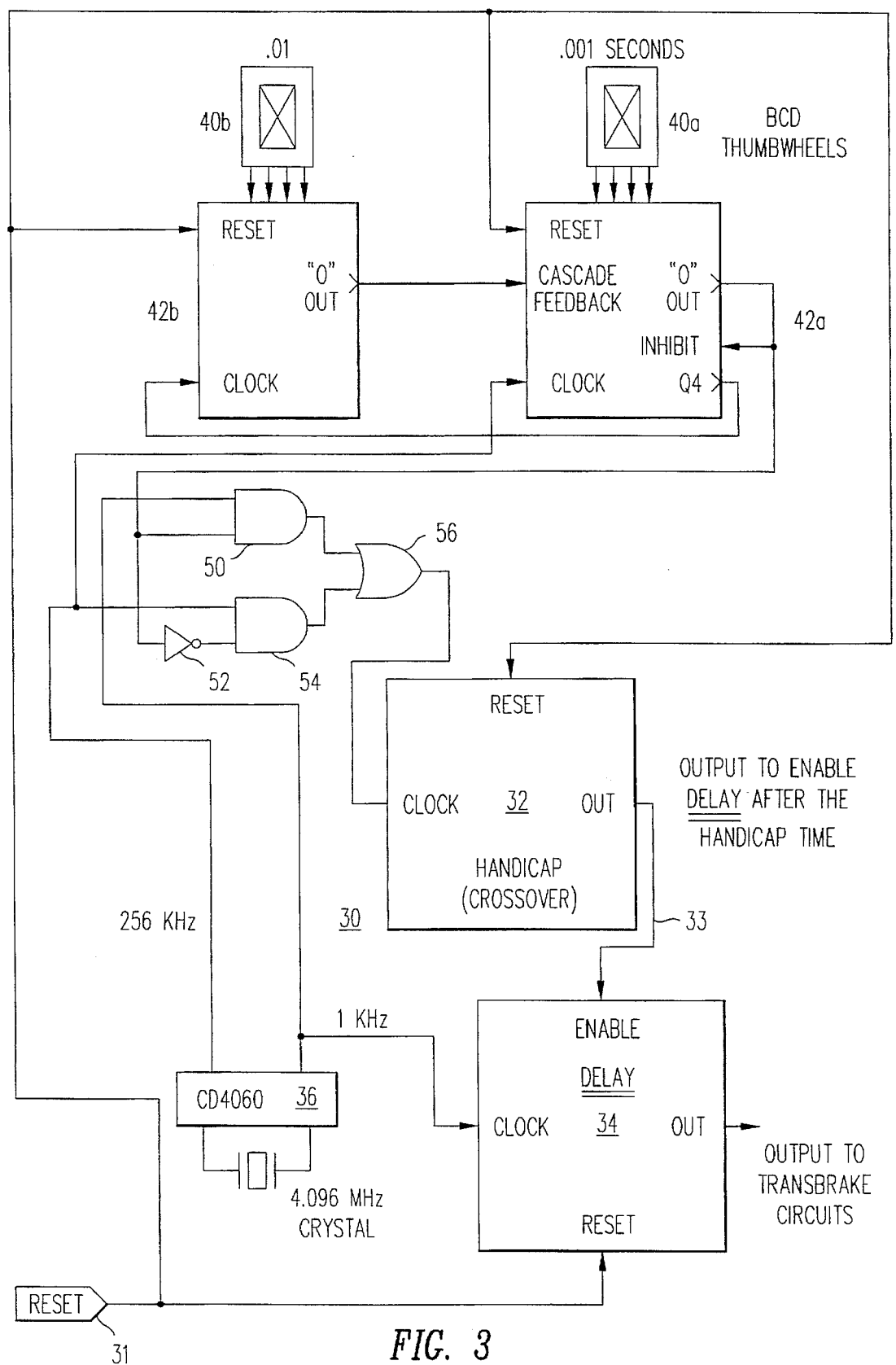
FIG. 3 is a block level circuit diagram of one embodiment of a cross-over compensation circuit of the present invention, using discrete electronic components.

Referring to FIG. 3 there is shown a schematic block level diagram of one embodiment of a delay apparatus 30 of the present invention, using discrete electronic components. The delay apparatus 30 is for use in a cross-over racing environment where the driver of the faster vehicle 10 is subject to a handicap period and a delay period and the delay apparatus 30 is started based upon the start command from a competitor's visual indicator such as the second Christmas tree lights 16.

The delay apparatus 30 comprises a handicap circuit section 32 and a delay circuit section 34 all as previously described, similar to the handicap circuit section 22 and the delay circuit section 24. In addition, the delay apparatus 30 comprises the frequency divider time base clock 36 as previously described. The clock 36, however, not only outputs a first clock signal at the rate of 1 KHz, but also outputs a second clock signal at the rate of 256 KHz. The delay apparatus 30 also comprises input switches 40 (a and b) which are in the nature of BCD thumbwheel switches which the user sets as the amount of cross-over compensation delay. The BCD thumbwheel switches 40 (a and b) are supplied to two decade counters 42 (a and b), respectively. In the preferred embodiment they are CD4522. The counters 42 (a and b) are set by the setting for the BCD thumbwheels 40 (a and b). The BCD thumbwheel switches 40 (a and b) adjust the time by 0.001 seconds and 0.01 seconds, respectively.

The second clock signal of 256 KHz is supplied to the clock input of the counter 42a. The "Q4" output of the counter 42a is supplied as an input to the counter 42b. The "0" output of the counter 42a is supplied to an inverter 52, and a first AND gate 50, and the enable or inhibit for the counter 42a. The reset signal from reset switch circuitry 31 is supplied to the counters 42 (a & b) and the reset of the handicap circuit section 32 and the enable of the delay circuit section 34 such that it is used to start the timing countdown.

When the reset switch circuitry 31 is released, the second clock signals of 256 KHz are supplied to the counter 42a. If the number of pulses of the second clock signal 256 KHz supplied to the counters 42 (a & b) are not equal to the count as set by the BCD thumbwheel switches 40, then the "O" output of the counter 42a would be a low signal. The low signal would not inhibit counter 42a. It is inverted by an inverter 52 which is then supplied to one of the inputs to a second AND gate 54. The second input to the second AND gate 54 is also the clock signal from the second clock signal of 256 KHz. The output signal from the counter 42a is also supplied to a first input of the first AND gate 50. The second input to the first AND gate 50 is from the first clock signal comprising of the 1 KHz pulse train. Since at this time, the "O" output signal of the counter 42a is low, the output of the first AND gate 50 would be low. The output of the first AND gate 50 and the output of the second AND gate 54 are supplied to an OR gate 56 which is then supplied to the clock input of the handicap circuit section 32. Since the output signal from the counter 42a is low, the second clock signal operating at 256 KHz are supplied through the second AND gate 54 through the OR gate 56 and into the handicap circuit section 32.

Upon the counters 42 reaching the number of pulses received from the second clock signal of 256 KHz equaling the number of counts set by the BCD thumbwheel switches 40, the "O" output signal of the counter 42a would be high. It would be inverted by the inverter 52 thereby generating a low output from the second AND gate 54. The high output signal for counter 42a would then enable the first clock signal of 1 KHz to be passed through the first AND gate 50, through the OR gate 56 and be supplied into the handicap circuit section 32. The high "O" output of the counter 42a, supplied to the inhibit of counter 42a would turn off the counter 42a.

When the handicap circuit section 32 receives the number of counts from both the first clock signal of 1 KHz and the second clock signal of 256 KHz, then it would output a signal 33 which would enable the delay circuit section 34. This would cause the first clock signal of 1 KHz to be counted by the delay circuit section 34. After an appropriate number of clock signal pulses is counted by the delay circuit section 34, it would generate an output signal to the trans-brake circuits to disengage the braking means, to start the vehicle.

The theory of the present invention is as follows. The handicap circuit section 32 is set with a time period by the user. That time period is converted by the handicap circuit section 32 into a number which is stored in its counter (not shown). The number stored in that counter represents a certain number of clock pulses, assuming the clock pulses arrive at the rate of 1 KHz. However, as can be seen, by the addition of the BCD thumbwheel switches 40, and the counters 42, and the logic gates of 50, 52, 54 and 56, a number of second clock pulses operating at the rate of 256 KHz is initially supplied to the handicap circuit section 32. Since the second clock signals at 256 KHz, are much faster than the first clock signals of 1 KHz (by a ratio of approximately 256 to 1), the counting of the clock pulses from the second clock signal would in essence subtract away from the amount of time that the handicap circuit section 32 is expected to count.

For example, if the handicap circuit section 32 has been programmed for a handicap period of 1 second, the circuitry in the handicap circuit section 32 sets its counter to 1000. It expects to receive 1000 pulses at the rate of 1 KHz per second to equal 1 second of the handicap period. However, if the BCD thumbwheel switches 40 were set by the user to program a compensation period of approximately 0.020 seconds, this would be set in the counters 42 as a value of 20. If 20 pulses at the rate of 1 KHz pulse were received, that would equal to 0.020 seconds. However, since the pulses supplied to the counter 42 are at a rate of 256 KHz, 20 pulses of the clock signal at 256 KHz equals a time period of approximately 0.0000781 seconds. This is a very short amount. More importantly, those 20 pulses at 256 KHz are also supplied to the handicap circuit section 32. The handicap circuit section 42 would first receive 20 pulses at 256 KHz (or 0.0000781 sec) followed by 980 pulses at 1 KHz (or 0.980 sec). Thus, the actual total amount of handicap period becomes 0.9800781 sec instead of 1.0000 sec. In essence, the compensation period as set by the BCD thumbwheel switches 40 is subtracted from the handicap period as stored in the handicap circuit section 32.

Upon the expiration of the handicap period as programmed into the handicap circuit section 32 and as adjusted by the compensation period, the output signal 33 therefrom, enables the delay circuit section 34 and the apparatus 30 continues as to operate as in the prior art.

Although the embodiment described shows the delay period being activated after the handicap period, the invention can also be practiced with the handicap period being activated after the delay period. Furthermore, the invention can be practiced by subtracting the compensation period from a total delay period consisting of the handicap delay period and the reaction delay period. In addition, although counters are described as being count-down circuits, they can also be count-up circuits.

Figure 4A:
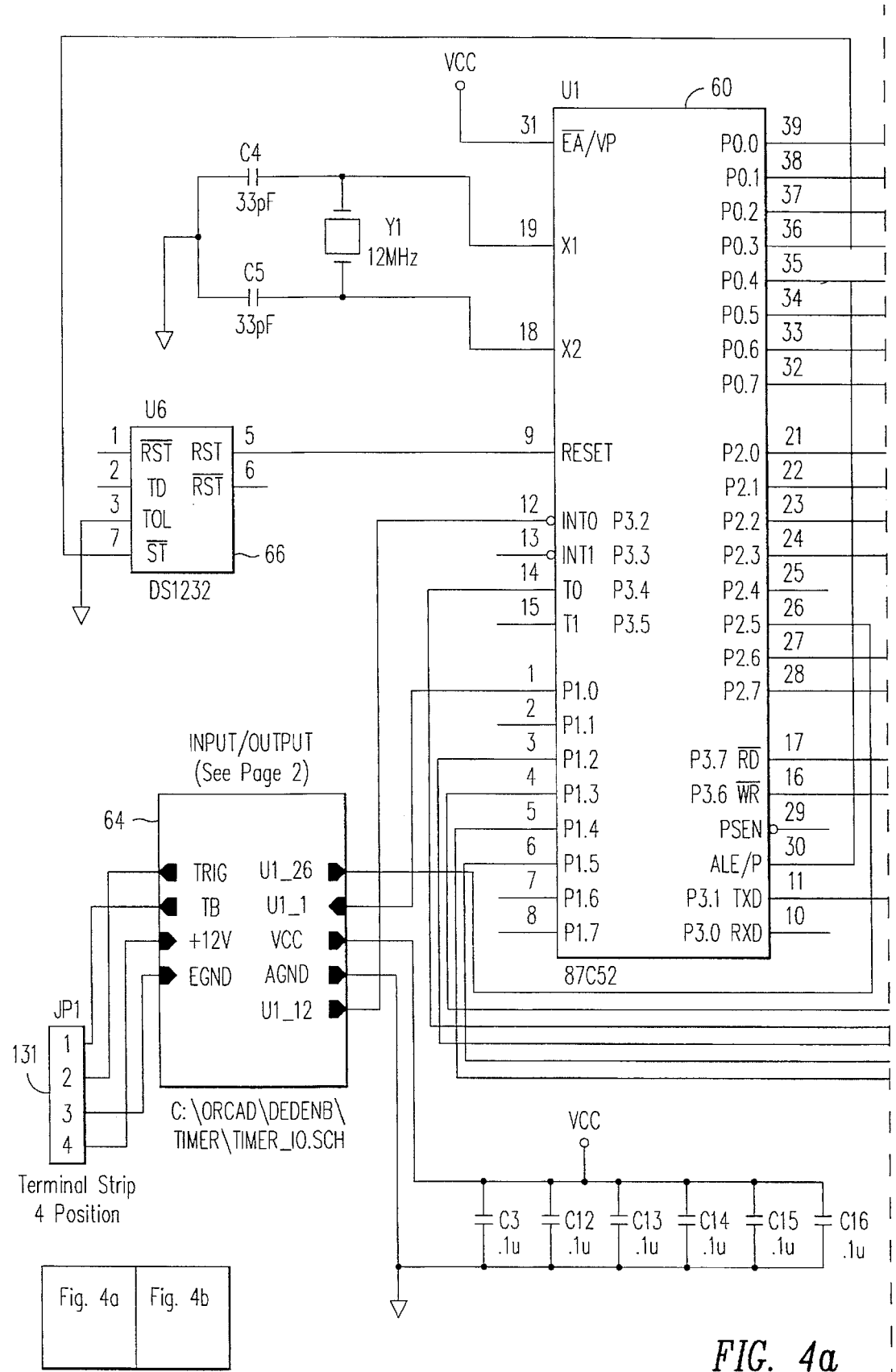
FIG. 4 is a block level circuit diagram of another embodiment of a cross-over compensation circuit of the present invention, using a microprocessor.
Figure 4B:
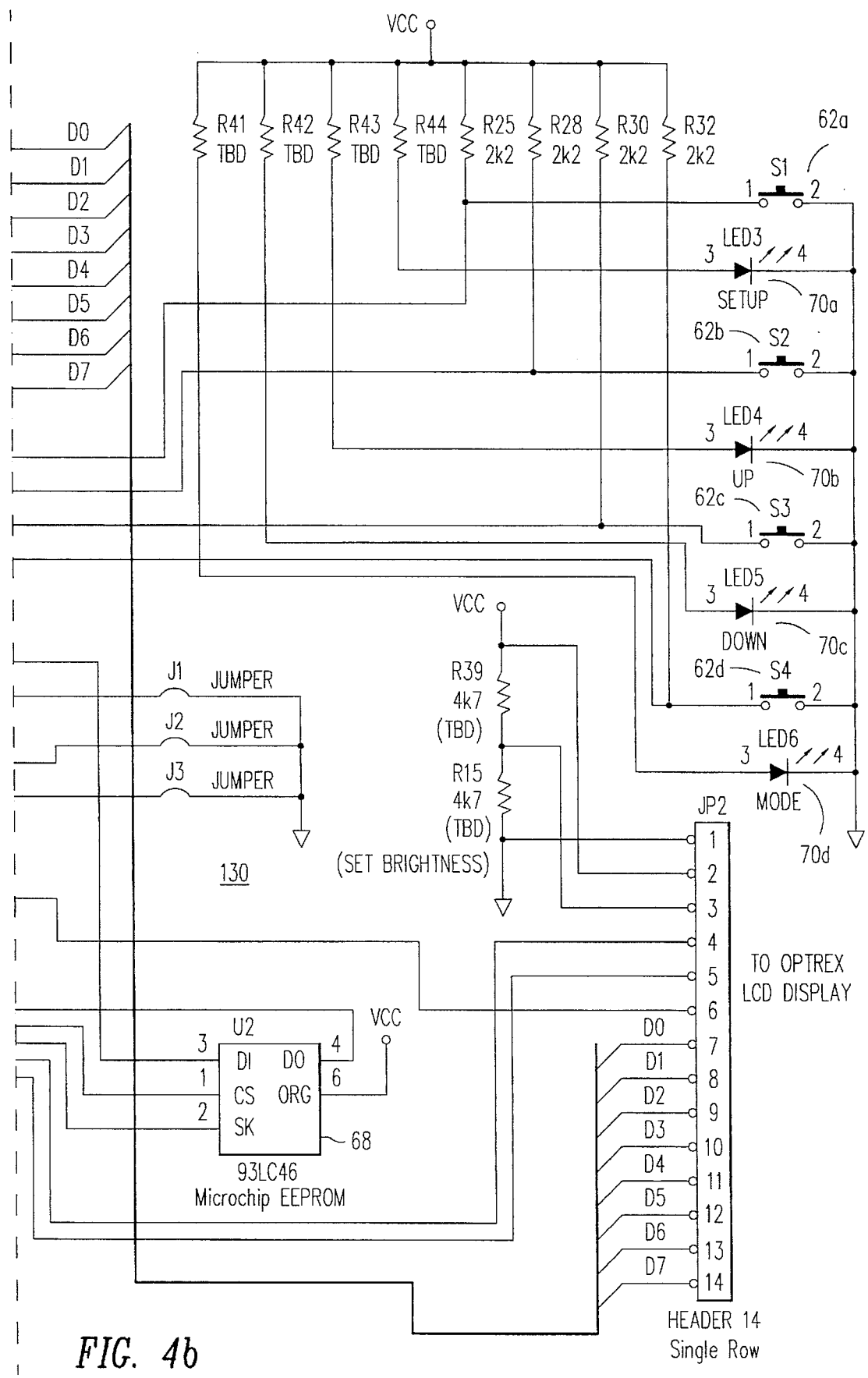

Referring to FIG. 4 there is shown a block level circuit diagram of another embodiment of a cross-over compensation circuit 130 of the present invention, using a microprocessor 60. In the preferred embodiment the microprocessor is a 87C52. The circuit 130 also input switches 62 (a–d), for inputting elapsed time, delay time, cross compensation time, and other data into the microprocessor 60. An input/output circuit 64 generates the reset signal and also interfaces the high power output of the microprocessor 60 to the trans-brake. In the preferred embodiment the input/output circuit 64 comprises filters and drive circuits which are well known in the art.

The circuit 130 also comprises a power monitor circuit 66. In the preferred embodiment, the power circuit 66 is a Dallas Semiconductor part DS1232. The circuit 130 also comprises an EEPROM 68, which is a non-volatile memory storing the data entered by the switches 62 (a–d). Associated with each switch 62 (a–d) is an LED 70 (a–d). The LEDs 70 (a–d) are constantly powered to illuminate the switches 62 (a–d) for night racing. Switch 62 (a) and LED 70 (a) is used to select the particular settings desired. The LEDs 70 (b–c) and their associated switches 62 (c–d) are used to select up or down (to increase or decrease) the switch settings. Finally, the LED 70 (d) and the associated switch 62 (d) is used to change the mode of operation desired, such as regular delay, cross over delay etc.

The microprocessor 60 is operated with a software program, a copy of the listing is attached in Appendix A.

As can be seen from the foregoing, by simply modifying the prior art delay apparatus 20, a new and improved delay apparatus 30 including cross-over compensation delay is achieved. The setting of the compensation period in the thumbwheel switches 40 (a and b) can be based upon the driver using a practice Christmas tree light. Such a practice Christmas tree light can be set up with simulating the "cross-over" racing environment for the user to determine the "compensation error".

Figure 5:
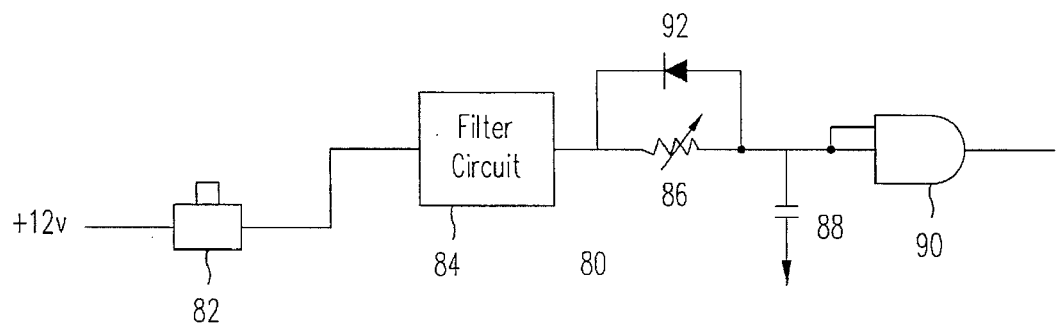
FIG. 5 is a schematic circuit diagram of a delay on circuit, which can be used with a prior art delay box, a prior art cross-over delay box, or with the cross-over compensation circuit of the present invention, of either FIG. 3 or FIG. 4.

Referring to FIG. 5, there is shown a "delay on" circuit 80, which can be used with the prior art delay device, or prior art cross-over delay device 20, or the cross-over delay device 30 or 130 shown in FIG. 3 or 4. As stated heretofore, with the transbrake switch of the prior art attached to the delay device or the cross-over delay device 20 of the prior art, any accidental bumping of the transbrake switch by the driver will cause the transbrake to lock on which can cause the transmission to explode or the wheels to lock up, if the car is moving.

With the delay on circuit 80, when the driver activates the switch 82 (by pressing and holding the switch 82), there is a time delay before the transbrake solenoid is engaged. The switch 82 is connected to a source of high voltage, such as 12 volts. When the driver activates the switch 82, the signal is supplied through a conventional filter circuit 84, and into a 500K potentiometer 86 (Clarostat brand model RV4LAYSA504A), which is connected to a 0.22 microfarad capacitor 88, to ground, and to the input of an AND gate 90 (Industry Standard Part No. CD4081). The output of the AND gate 90 goes to the existing trigger input of a prior art delay box, or a prior art cross-over delay box 20, or into reset 31 of the cross-over delay box 30 or trigger input 131 of the cross-over delay device 130 shown in FIGS. 3 and 4. A diode 92 (1N4148) is connected in parallel with the resistor 86.

In operation, when the switch 82 is activated, the input to the filter circuit 84 goes high. The capacitor 88 is charged up through the potentiometer 86, which is changeable by the user. The amount of time to charge the capacitor 88 is determined by the RC constant of the resistor 86 and the capacitor 88. When the capacitor 88 charges to the threshold voltage of the AND gate 90, the gate 90 turns on, and passes the trigger signal into the delay box circuit. If the switch 82 is released, the voltage at the potentiometer 86 is discharged through the filter circuit 84 into ground (through the circuit elements of the filter circuit 84, which is connected to ground). The charge on the capacitor 88 will discharge quickly through the diode 92, thereby instantly turning off the circuit 80. This is to reset the delay on circuit 80. Thus, if the driver sets the potentiometer 86 to a value, e.g. such that the RC time constant would require 0.3 sec. for the capacitor 88 to charge to a level to activate the AND gate 90, and if the driver accidentally hits the switch 82, keeping it on for only 0.1 seconds, the transbrake solenoid would not be activated.

The transbrake solenoid could be purposefully activated, when the driver is at the start line, by holding the switch 82 for an amount of time greater than the time set by the RC time constant of the resistor 86 and the capacitor 88 (e.g. 0.3 second). When the driver releases the switch 82, the delay that is set in the delay box or the cross over delay box 20, or 30 or 130, would time out, to release the transbrake and start the race. The amount of time (i.e. determined by the RC constant) set to activate the transbrake can be set by the user, through the use of a variable resistor 86, as disclosed herein, or it can be pre-set by the manufacturer of the device.

Although the delay on circuit 80 is shown in FIG. 5 as comprising a capacitor 88, a variable resistor 86 and diode 92, the function of the delay on circuit 80 can also be implemented in software, for use with, e.g. the cross-over delay apparatus 130, shown in FIG. 4, using a microprocessor 60.

```
;*****************************************
;*This is the Final RUN CROSSOVER State
;* (c) Copyright Dedenbear Products, 1995
;*****************************************
          STCROSS:  CALL    SUBTRACT          ;Determine Crossover Handicap Time by subtracting Their ET
                                              ; and Cross comp from YOUR ET
                    CALL    STTIM0            ;Start timer0
                    MOV     R0,#ADELAYON      ;For DIVIDE to calculate VDLY65 and VDLYREM
                    CALL    DIVIDE            ;Calculate how many times 65msecs have to be counted
                    MOV     A,VDLY65+1
                    JZ      REMONLC           ;Total time is < 65 msecs, don't count 65msec pulses ;Delay "Delay-On Time" from here on
          WAIT1MS:  JB      TBSWITCH,STCROSS  ;If button released before time out, start over
                    JNB     TF0,WAIT1MS       ;65 milliseconds NOT expired yet, wait here
                    CALL    CHCKTIM0
                    CLR     C
                    MOV     A,VTIMER0+1
                    SUBB    A,VDLY65+1        ;COMPARE VTIMER0 TO VDELAYON
                    JC      WAIT1MS           ;If VDEALYON >= VTIMER, GET NEXT 1MS
          REMONLC:  CALL    REMTIM0           ;Start timer0 for remnant part of delay
                    JNB     TF0,$             ;Wait for final remnant to time out
                    CLR     TRANSBRK          ;Turn Transbrake on after delay on time
                    CLR     THROTTLE          ;Set Throttle Stop
          WAITHAR:  JB      TBSWITCH,HANDICAP ;Wait here until TB switch is released
                    JMP     WAITHAR ;LSB of VDLY65 was 0, check if MSB is zero too
          CHCK65M:  MOV     A,VDLY65
                    JZ      REMONLD           ;Both MSB and LSB are zero, only do remnant
                    JMP     WAYT1MS ;Delay "Handicap Time" from here on
          HANDICAP: CALL    STTIM0
                    MOV     R0,#VHANDCAP      ;For DIVIDE to calculate VDLY65 and VDLYREM
                    CALL    DIVIDE            ;Calculate how many times 65msecs have to be counted
                    MOV     A,VDLY65+1
                    JZ      CHCK65M
          WAYT1MS:  JNB     TBSWITCH,DEBUMP1  ;Check TBSWITCH pressed for reset to start
                    JNB     TF0,WAYT1MS       ;65 milliseconds NOT expired yet, wait here
                    CALL    CHCKTIM0
                    JZ      INCMSBD           ;When VTIMER0+1 overflows, increment VTIMER0 (MSB)
          BACK11:   CLR     C
                    MOV     A,VTIMER0
                    SUBB    A,VDLY65          ;If VTIMER0 != MSB of VHANDCAP
                    JC      WAYT1MS           ;If VTIMER0 <= MSB of VHANDCAP time, add another 1ms
                    MOV     A,VTIMER0+1       ;LSB of counter
                    CLR     C
                    SUBB    A,VDLY65+1
                    JC      WAYT1MS
          REMONLD:  CALL    REMTIM0           ;Start timer0 for remnant part of delay
                    JNB     TF0,$             ;Wait for final remnant to time out
                    SETB    THROTTLE          ;Clear Throttle after handicap time has expired ;Delay "Delay Time" from here on.
                    CALL    STTIM0
                    MOV     R0,#ADELAY
                    CALL    DIVIDE            ;Calculate how many times 65msecs have to be counted
                    MOV     A,VDLY65+1
                    JZ      REMONLE
          WHAIT1MS: JNB     TBSWITCH,DEBUMP2  ;Check TBSWITCH pressed for reset to start
                    JNB     TF0,WHAIT1MS      ;65 milliseconds NOT expired yet, wait here
                    CALL    CHCKTIM0
                    JZ      INCMSBG           ;When VTIMER0+1 overflows, increment VTIMER0 (MSB)
          BACK15:   CLR     C
```

APPENDIX A

/6b

3/4

```
            MOV     A,VTIMER0
            SUBB    A,VDLY65            ;If VTIMER0 != MSB of CROSSOVER delay time
            JC      WHAIT1MS            ;If VTIMER0 <= MSB of crossover Delay time, add another 1ms
            MOV     A,VTIMER0+1
            CLR     C                   ;LSB of counter
            SUBB    A,VDLY65+1
            JC      WHAIT1MS
REMONLE:    CALL    REMTIM0             ;Start timer0 for remnant part of delay
            JNB     TF0,$               ;Wait for final remnant to time out
            SETB    TRANSBRK
            MOV     DPTR,#KGONE         ;Car has left starting line !!   Good Luck in the race !!!
            CALL    DISPLAY
            CALL    NEXTBLOC
            MOV     DPTR,#KGONE1
            CALL    DISP
            CALL    DELAY4MS
            MOV     SFIRST,#1           ;Set 1st time true to display RUN(DELAY) again
            RET DEBUMP1:    JB      WAIT1MS             ;If TBSWITCH pressed while HANDICAP timing out, do this
            CLR     TRANSBRK            ;Turn Transbrake BACK ON
            CLR     THROTTLE            ;Set Throttle AGAIN
            JMP     WAITHAR DEBUMP2:    JB      WHAIT1MS            ;If TBSWITCH pressed while HANDICAP timing out, do this
            CLR     TRANSBRK            ;Turn Transbrake BACK ON
            CLR     THROTTLE            ;Set Throttle AGAIN
            JMP     WAITHAR INCMSBD:    INC     VTIMER0
            MOV     A,VTIMER0
            JMP     BACK11

INCMSBG:    INC     VTIMER0
            MOV     A,VTIMER0
            JMP     BACK15

;Determine Crossover Handicap Time by subtracting Their ET and Cross comp from YOUR ET
SUBTRACT:   CLR     C
            MOV     A,VTHEIRET+1
            SUBB    A,VYOURET+1
            MOV     VHANDCAP+1,A        ;Save LSB of product in VHANDCAP+1
            MOV     A,VTHEIRET
            SUBB    A,VYOURET
            MOV     VHANDCAP,A
            JC      HANDCAP0
;Multiply VHANDICAP by 10
            MOV     A,VHANDCAP+1
            MOV     B,#0AH              ;Since YOUR ET and THEIR ET are stored in 10s of msecs,
            MUL     AB                  ; multiply MSB result by 10 to get answer in msecs
            MOV     R0,B                ;MSB of product saved in R0 FOR CARRY OVER
            MOV     VHANDCAP+1,A        ;Save LSB of final result
            MOV     A,VHANDCAP          ;Do the same with the MSB of VHANDCAP
            MOV     B,#0AH
            MUL     AB
            ADD     A,R0                ;Add CARRY-OVER MSB of product to current product LSB
            MOV     VHANDCAP,A          ;Save LSB of final result
;Subtract Cross Compensation from Handicap time
            CLR     C
            MOV     A,VHANDCAP+1
            SUBB    A,VCROSS+1          ;VCROSS from VHANDCAP LSB
            MOV     VHANDCAP+1,A
            MOV     A,VHANDCAP
            SUBB    A,VCROSS
            MOV     VHANDCAP,A
            JC      HANDCAP0
```

3/4

```
BECK12: RET

;******************************************************
;* Start Timer0 H/W and S/W counters
;******************************************************
STTIM0:  CLR   TR0              ;Make sure timer0 is stopped
         MOV   TH0,#K65MSHI     ;Set timer0 high register to produce 65ms pulses
         MOV   TL0,#K65MSLO     ;Set timer0 low register to produce 65ms pulses
         CLR   TF0              ;Clear Timer0 Overflow bit
         SETB  TR0              ;Start timer0
         MOV   VTIMER0,#0       ;Reset timer0 counter MSB
         MOV   VTIMER0+1,#0     ;Reset timer0 counter LSB
         RET ;Stop and start H/W TIM0 and check S/W counter, leaves VTIMER0+1 in ACC
CHCKTIM0: CLR  TR0
         MOV   TH0,#K65MSHI     ;Set timer0 high register to produce 65ms pulses
         MOV   TL0,#K65MSLO     ;Set timer0 low register to produce 65ms pulses
         CLR   TF0
         SETB  TR0              ;Start timer0 again
         INC   VTIMER0+1
         MOV   A,VTIMER0+1      ;LSB of counter. If this counter has overflown to 0,
                                ; calling routine will increment MSB of VTIMER0
         RET ;Start timer0 with remnant of required time delay in usecs
REMTIM0: CLR   TR0              ;Make sure timer0 is stopped
         MOV   TH0,VDLYREM
         MOV   TL0,VDLYREM+1    ;Set timer0 low register to produce 65ms pulses
         CLR   TF0              ;Clear Timer0 Overflow bit
         SETB  TR0              ;Start timer0
         MOV   VTIMER0,#0       ;Reset timer0 counter MSB
         MOV   VTIMER0+1,#0     ;Reset timer0 counter LSB
         RET ;******************************************************
;* Divide calculates the number of times 65 msecs has to
;* be counted as well as the remainder.
;* DIVIDE is called with the address of the variable to
;* be divided by 65 in R0. The 16-bit variable has its
;* MSB (8-bit) at the address in R0 and LSB (8-bit) in
;* address in R0 + 1.
;* On return, the result of the divide by 65 is in VDLY65
;* and the remnant is in VDLYREM
;* Since the 87C52 only has an 8-bit divide, do a conditional
;* subtraction until the result is less than or equal to 8 bits.
;* The routine checks to see if a 16-bit divide is required or not.
;******************************************************
DIVIDE:  MOV   B,#65            ;Divisor
         MOV   A,@R0            ;MSB of variable in ACC
         JZ    ONLYLSB          ;If MSB is 0, only do 8 bit divide
;Divide MSB/LSB by 65 by subtracting 65 n times, Quotient in memory,
;Remnant in R2 (remnant will be < 8 bits)
         MOV   R1,A             ;MSB of variable in R1
         INC   R0               ;Point to LSB of variable
         MOV   A,@R0            ;LSB in ACC
         MOV   R2,A             ;R2 contains LSB of variable
         MOV   VDLY65+1,#0      ;Start with 0, increment at each divide no carry
         MOV   VDLY65,#0        ;Start with 0, increment at each divide no carry
AGAINX:  CLR   C
         SUBB  A,#65            ;Subtract from LSB
         MOV   R3,A             ;Store remnant of LSB in R3
         MOV   A,R1             ;Get MSB
         SUBB  A,#0H            ;Only subtract Carry flag
```

```
              JNC     AGAINY
;Now that the 16 bit value has been reduced to 8 bit, do regular
;divide using DIV AB. Divide remnant by #65.
              MOV     A,R2            ;Get remnant of previous subtract
              MOV     B,#65
              DIV     AB
              CLR     C
              ADD     A,VDLY65+1      ;Add result of 8-bit divide to result of 16-bit
              MOV     DLY65+1,A
              ;Remnant is in B register and is in milliseconds. To get a value to program
              ; into timer, multiply by 1000 [3E8H] (since timer is in msecs) and subtract from
              ; FFFF.
              ;Save a copy of the remnant in VDLYREMM for use by other routines
              MOV     DLYREMM,B
              CALL    ALREM           ;Do the conversion
BACDIV:       RET AGAINY:       MOV     1,A             ;Store remnant of MSB back in R0
              INC     DLY65+1
              MOV     ,VDLY65+1
              JZ      NCAGA
BACAGA:       OV      ,R3             ;Get saved LSB remnant
              MOV     R2,A            ;Update LSB
              JMP     AGAINX
INCAGA:       INC     VDLY65
              JMP     BACAGA ONLYLSB:      INC     R0              ;Point to LSB of variable to be divided
              MOV     A,@R0           ;LSB now in ACC
              DIV     AB
              MOV     VDLY65,#0       ;MSB Result in VDLY65 always 0
              MOV     VDLY65+1,A      ;Result in VDLY65
              CALL    CALREM          ;Remainder of divide still in B reg.
              JMP     BACDIV ;Convert remnant from milliseconds to a timer value in usecs to count up to FFFF
CALREM:       MOV     R1,B            ;Save B temporarily
              MOV     A,#0E8H         ;LSB of 1000 ; 3E8H
              MUL     AB              ;Multiply will have LSB of product in ACC, MSB in B
              MOV     VDLYREM+1,A     ;LSB Remnant in VDLYREM
              MOV     R0,B            ;Save MSB carry-over in R0
              MOV     A,#03H          ;MSB of 3E8
              MOV     B,R1            ;Get original remnant again
              MUL     AB
              ADD     A,R0            ;Add previous carry-over
              MOV     VDLYREM,A       ;MSB of remnant to be programmed into timer
              CLR     C
              MOV     A,#0FFH
              SUBB    A,VDLYREM+1
              MOV     VDLYREM+1,A
              MOV     A,#0FFH
              SUBB    A,VDLYREM       ;Subtract with carry
              MOV     VDLYREM,A
              RET
```

What is claimed is:

1. A cross-over compensation circuit for controlling the start of a vehicle, wherein said vehicle is started by engaging the engine of said vehicle and braking means to hold said vehicle, then disengaging said braking means after a period of delay and a handicap period, said circuit comprising:

adjustable time delay means for setting said period of delay and said handicap period;

user selectable means for setting a compensation period; and means, responsive to said user selectable means, for adjusting said adjustable time delay means by said compensation period and for disengaging said braking means.

2. The circuit of claim 1 wherein said adjustable time delay means comprises:

first clock means for generating a first clock signal comprising a train of pulses;

handicap means for setting said handicap period;

delay means for setting said period of delay, said delay means activated by said handicap means, and for disengaging said braking means; and said first clock signal supplied to said delay means for counting said period of delay after activation by said handicap means.

3. The circuit of claims 2 wherein said user selectable means comprises means for setting a counter.

4. The circuit of claim 3 wherein said counter is a count down counter.

5. The circuit of claim 4 wherein said means for adjusting further comprising:

second clock means for generating a second clock signal comprising a train of pulses having a frequency faster than the frequency of said first clock signal;

means for supplying said second clock signal to said counter and to said handicap means; and logic means for supplying said first clock signal to said handicap means upon said counter counting a number of second clock signal pulses set in said counter.

6. The circuit of claim 5 wherein said first clock means and said second clock means are the same means.

7. The circuit of claim 1 wherein said adjustable time delay means comprises:

first clock means for generating a first clock signal comprising a train of pulses;

delay means for setting said delay period;

handicap means for setting said period of handicap, said handicap means activated by said delay means, and for disengaging said braking means; and said first clock signal supplied to said handicap means for counting said period of handicap after activation by said delay means.

8. The circuit of claims 7 wherein said user selectable means comprises means for setting a counter.

9. The circuit of claim 8 wherein said counter is a count down counter.

10. The circuit of claim 9 wherein said means for adjusting further comprising:

second clock means for generating a second clock signal comprising a train of pulses having a frequency faster than the frequency of said first clock signal;

means for supplying said second clock signal to said counter and to said delay means; and logic means for supplying said first clock signal to said delay means upon said counter counting a number of second clock signal pulses set in said counter.

11. The circuit of claim 10 wherein said first clock means and said second clock means are the same means.

12. The circuit of claim 1 further comprising:

means for activating said braking means after a period of pre-set delay, so long as said activating means is continuously engaged during said period of pre-set delay.

13. The circuit of claim 12, wherein said period of pre-set delay is user selectable.

14. The circuit of claim 13, wherein said activating means comprises an RC circuit with a user selectable variable resistor.

15. The circuit of claim 12 further comprising means for resetting said activating means, in the event said activating means is disengaged prior to the expiration of said period of pre-set delay.

16. The circuit of claim 15, wherein said activating means comprises an RC circuit with a variable resistor.

17. The circuit of claim 16, wherein said resetting means comprises a diode connected in parallel with said variable resistor.

18. A cross-over compensation circuit for controlling the start of a vehicle, wherein said vehicle is started by engaging the engine of said vehicle and braking means to hold said vehicle, then disengaging said braking means after a total delay period including a reaction period and a handicap period, said circuit comprising:

a microprocessor means;

a storage means for storing said total delay period;

input means for causing said total delay period to be stored in said storage means, and for further inputting a compensation period into said microprocessor means; and wherein said microprocessor means adjusts said total delay period by said compensation period to produce a compensated period, and disengages said braking means, upon expiration of said compensated period.

19. The circuit of claim 18 further comprising:

means for activating said braking means after a period of pre-set delay, so long as said activating means is continuously engaged during said period of pre-set delay.

20. The circuit of claim 19, wherein said period of pre-set delay is user selectable.

21. The circuit of claim 20, wherein said activating means comprises an RC circuit with a user selectable variable resistor.

22. The circuit of claim 19 further comprising means for resetting said activating means, in the event said activating means is disengaged prior to the expiration of said period of pre-set delay.

23. The circuit of claim 22, wherein said activating means comprises an RC circuit with a variable resistor.

24. The circuit of claim 23, wherein said resetting means comprises a diode connected in parallel with said variable resistor.

25. The circuit of claim 18, further comprising means for activating said braking means, said activating means for generating a signal to said microprocessor means, and wherein said microprocessor means, responsive to said signal generated, further comprising means for activating said braking means after a period of preset delay, so long as said activating means is continuously engaged during said period of pre-set delay.

26. The circuit of claim 25, wherein said period of pre-set delay is user selectable.

27. The circuit of claim 26 further comprising means for resetting said activating means, in the event said activating means is disengaged prior to the expiration of said period of pre-set delay.

28. A method for controlling the start of a vehicle by a user in a competitive racing environment, where said vehicle of said user traverses in a user lane, and wherein a competitor's vehicle traverses in a competitor's lane, wherein said vehicle is started by engaging the engine of said vehicle and braking means to hold said vehicle, said method comprising:

setting a total delay period in a delay means by said user, said total delay period being the sum of a handicap delay and a reaction delay;

setting a compensation period, said compensation period being the difference in said user's response to the detection of a start in the user's lane and the detection of a start in the competitor's lane;

subtracting said compensation period from said total delay period by said delay means to produce a subtracted period; and disengaging the braking means after said subtracted period.

29. A delay on circuit for use with an electronic device to control the start of a vehicle, wherein said vehicle is started by engaging the engine of said vehicle and braking means to hold said vehicle, then disengaging said braking means after a period of delay, said delay on circuit comprising:

means for activating said braking means after a period of pre-set delay, so long as said activating means is continuously engaged during said period of pre-set delay; and means for resetting said activating means, in the event said activating means is disengaged prior to the expiration of said period of pre-set delay.

30. The circuit of claim 29, wherein said period of pre-set delay is user selectable.

31. The circuit of claim 30, wherein said activating means comprises an RC circuit with a user selectable variable resistor.

32. The circuit of claim 31, wherein said resetting means comprises a diode connected in parallel with said variable resistor.

* * * * *